(12) United States Patent
Kwon et al.

(10) Patent No.: US 9,008,482 B2
(45) Date of Patent: Apr. 14, 2015

(54) OPTICAL CABLE TERMINAL BOX

(75) Inventors: Oh-Joon Kwon, Seoul (KR); Joon Huh, Seoul (KR); Gyeong-Ho Jang, Siheung-si (KR); Pyung-Rae Ahn, Namyangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/003,977

(22) PCT Filed: Mar. 7, 2012

(86) PCT No.: PCT/KR2012/001641
§ 371 (c)(1),
(2), (4) Date: Sep. 9, 2013

(87) PCT Pub. No.: WO2012/121536
PCT Pub. Date: Sep. 13, 2012

(65) Prior Publication Data
US 2013/0343716 A1    Dec. 26, 2013

(30) Foreign Application Priority Data
Mar. 10, 2011    (KR) .................. 10-2011-0021284

(51) Int. Cl.
*G02B 6/00* (2006.01)
*G02B 6/44* (2006.01)
*G02B 6/46* (2006.01)

(52) U.S. Cl.
CPC .............. *G02B 6/4441* (2013.01); *G02B 6/445* (2013.01); *G02B 6/46* (2013.01)

(58) Field of Classification Search
CPC ........................................................ G02B 6/445
USPC ........................................................ 385/135
See application file for complete search history.

(56) References Cited

U.S. PATENT DOCUMENTS

2005/0175307 A1 * 8/2005 Battey et al. ................. 385/135
2009/0238531 A1   9/2009 Holmberg et al.

FOREIGN PATENT DOCUMENTS

| KR | 20-0380997 Y1 | 4/2005 |
| KR | 20-0423984 Y1 | 8/2006 |
| KR | 10-2006-0120308 A | 11/2006 |
| KR | 10-2010-0027636 A | 3/2010 |
| KR | 10-2010-0038484 A | 4/2010 |
| WO | 2010/036549 A1 | 4/2010 |

* cited by examiner

*Primary Examiner* — Ryan Lepisto
(74) *Attorney, Agent, or Firm* — Jefferson IP Law, LLP

(57) ABSTRACT

An optical cable terminal box for distributing an optical cable with a plurality of cores to subscriber lines is provided. The optical cable terminal box may include a housing having a slot, the slot having a first receiving groove formed at an edge of the slot. The optical cable terminal box may also include a cover member coupled to the housing to close the slot, and the cover member may have a second receiving groove formed at an edge of the cover member. When the cover member closes the slot, the first and second grooves may be coupled to each other to form a wiring hole that is configured to pass an optical cable therethrough.

8 Claims, 3 Drawing Sheets

OPTICAL CABLE TERMINAL BOX

TECHNICAL FIELD

The following description relates to an optical cable line, and more particularly to an optical cable terminal box for distributing an optical fiber with a plurality of cores into a plurality of subscriber lines.

BACKGROUND ART

An optical cable terminal box is generally provided to connect, branch or arrange an optical cable of an optical cable line. An optical terminal cable box is typically used to distribute the optical cable to one or more subscriber lines. An optical communication line is distributed to one or more subscriber lines by branching one or more cores among a plurality of cores of an optical cable that is wired into a terminal box. Each of the remaining cores undistributed to the subscriber lines in the terminal box is wired to an optical communication line while maintaining the form of an optical cable. That is, a part of the optical cable is received in the terminal box on the optical communication line, and some of the cores of the optical cable are branched out as the subscriber lines through the terminal box.

Such an optical cable terminal box is typically anchored to a telephone pole or an indoor or outdoor wall rather than being buried underground. In addition, such an optical cable terminal box typically receives one or more optical adaptors, connectors, cables or the like to protect the connecting and branching parts of optical fibers in the field.

In a conventional optical cable terminal box, one or more wiring holes are independently formed; this makes it necessary to cut an optical fiber to introduce the optical fiber into the inside of a terminal box in order to wire the optical cable into the terminal box. Accordingly, only a required number of cores are branched to subscriber lines in the terminal box, and the remaining cores are fusion-spliced to the cores of a new optical cable introduced into the inside of the terminal box through a separate wiring hole, respectively. The optical cable extends to an optical communication line.

However, it is inconvenient for a technician to cut and fusion-splice non-branched cores to the cores of a new optical cable whenever a terminal box is installed. Further, when a technician cuts and fusion-splices the non-branched cores, it is unavoidable that at least some of the connecting parts will suffer from connection loss.

An optical cable terminal box for solving this problem is disclosed in Korean Patent No. 947,631 registered on Mar. 8, 2010 in the Korean Intellectual Property Office. The terminal box is configured to allow an optical cable to be introduced into the terminal box without being cut. In addition, the terminal box allows only the required cores to be cut and connected to the respective subscriber lines within the cable box. The terminal box has a pair of wiring holes that are located adjacent to each other and a communication hole that interconnects the wiring holes; thus, the optical cable can be wired into the terminal box without being cut.

DISCLOSURE OF INVENTION

Technical Problem

While the conventional optical cable terminal box allows the wiring of an optical cable even if the cores of the optical cable are not entirely cut, the sheath of the optical cable typically should be removed prior to introducing the optical cable through the communication hole. This may cause the cores to be deformed or damaged during the process of introducing them into the communication hole. Furthermore, it is necessary to join a protective sealing tube by press-fitting so as to provide waterproofing between the optical cable and the corresponding wiring hole, which makes it difficult to perform the wiring operation.

Solution to Problem

In one general aspect, there is provided an optical cable terminal box for distributing an optical cable with a plurality of cores to subscriber lines. The optical cable terminal box may include a housing having a slot, and the slot may have a first receiving groove formed at an edge of the slot. The optical cable terminal box may also have a cover member that is slidably coupled to the housing in order to close the slot, and the cover member may have a second receiving groove formed at an edge of the cover member. When the cover member closes the slot, the first and second grooves may be coupled to each other to form a wiring hole that is configured to pass an optical cable therethrough.

The cover member may have slits which are formed at the opposite side edges thereof, and the slits may be positioned to partially wrap inner and outer surfaces of the hosing in the vicinity of the slot.

The optical cable terminal box may also include a tie protrusion formed on the outer surface of the housing adjacent to the slot, a tie rib that extends from the edge of the cover member, and a tie groove formed on the tie rib. The cover member may be coupled to the housing, and the tie protrusion may be engaged with the tie groove. The wiring hole may be formed at each side of the tie protrusion.

The optical cable terminal box may further include guide members that are formed on the inner and outer surfaces at each of the opposite side edges to be opposite to each other, the slits being formed between the guide members.

The cover member may also include a fastening member extending from the edge of the cover member and positioned inside of the housing. The fastening member may be fastened to the inside of the housing.

The optical cable terminal box may also include a cable bushing positioned in the wiring hole to wrap the optical cable. The cross-section of the cable bushing sectioned perpendicularly to the longitudinal direction of the optical cable may have a C-shape.

The optical cable terminal box may also include a sealing groove formed on the outer periphery of the cable bushing. Each of the housing and the cover member may be partially inserted into the sealing groove.

In another aspect, there is provided an optical cable terminal box for distributing an optical cable with a plurality of cores to subscriber lines that includes a housing having a slot. The slot may have a first receiving groove formed at an edge of the slot. The optical cable terminal box may also include a cover member coupled to the housing and configured to close the slot, the cover member having a second receiving groove formed at an edge of the cover member. When the cover member closes the slot, the first and second grooves may be coupled to each other to form a wiring hole. The cover member may be removably coupled to the housing.

In yet another aspect, there is provided a method for distributing an optical cable. The method may involve opening a cover of an optical terminal box, the optical terminal box having the cover and a housing having a slot, and the slot having a first receiving groove formed at an edge of the slot. The cover member of the optical terminal box may be coupled to the housing and configured to close the slot. The cover member may have a second receiving groove formed at an edge of the cover member. When the cover member closes the slot, the first and second grooves may be coupled to each other to form a wiring hole.

The method may further involve removing the cover member to pass an optical cable through the wiring hole.

Further, the method may also involve fitting a cable bushing around an optical cable, and coupling the cover member to the housing with the optical cable and the cable bushing in the wiring hole. The optical cable terminal box may further include a sealing groove formed on the outer periphery of the cable bushing, and each of the housing and the cover member may be partially inserted into the sealing groove.

Other features and aspects may be apparent from the following detailed description, the drawings, and the claims.

Advantageous Effects of Invention

The inventive optical cable terminal box configured as described above may have open-type wiring holes formed by using a slot formed in the housing and the cover member coupled to the housing through a sliding movement. As a result, an optical cable can be wired to the interior of the housing of the terminal box without being cut. Accordingly, because no fusion-splicing is required for connecting remaining cores except for the cores required for branching, the optical cable can be easily installed. In addition, because the optical cable can be wired through the slot formed in the housing after separating the cover member, the wiring can be easily performed.

Figure 1:
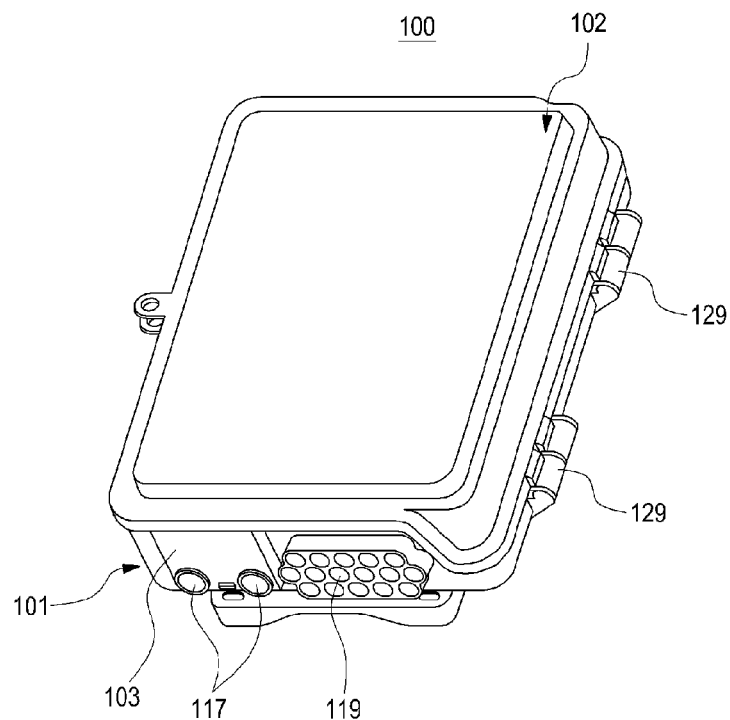
FIG. 1 is a perspective view illustrating an example of an optical cable terminal box.
Figure 2:
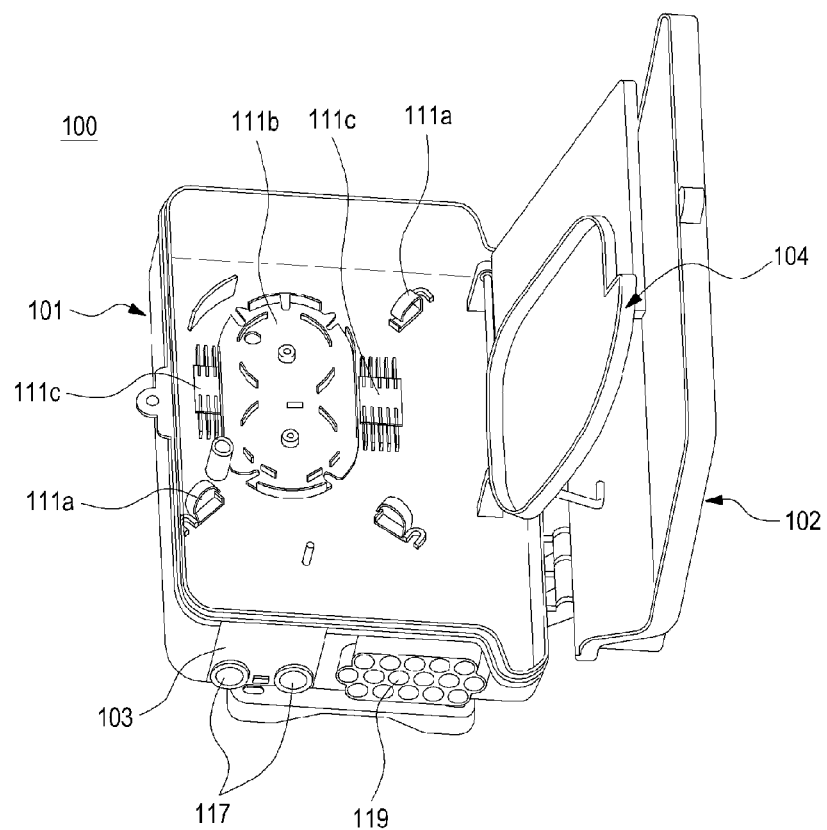
FIG. 2 is a perspective view illustrating an example of the optical cable terminal box in an opened state.

Throughout the drawings and the detailed description, unless otherwise described, the same drawing reference numerals will be understood to refer to the same elements, features, and structures. The relative size and depiction of these elements may be ex-aggerated for clarity, illustration, and convenience.

BEST MODE FOR CARRYING OUT THE INVENTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIGS. 1 to 4 illustrate an example of an optical terminal box 100 (hereinafter, to be referred to as "terminal box"). Such an optical terminal box 100 may have a housing 101, to which a cover 102 may be pivotally coupled through a hinge unit 129. An adaptor tray 104 may be provided inside the housing 101. Although not shown, the adaptor tray 104 may be provided with a plurality of optical adaptors. The optical adaptors may be configured to branch cores 151 of an optical cable 105 or to connect individual branched cores to one or more subscriber lines. The housing 101 may be provided on its side with one or more pivot support members 129a, and the one or more pivot support members 129a may form one or more hinge units 129. In addition, other pivot support members 141 may be provided inside the housing 101 in order to install the adaptor tray 104. By opening the cover 102, a technician may have an access to the branch cores 151 of an optical cable 105 that is located inside the housing 101.

The housing 101 may be provided with a remaining length processing part 111b. The remaining length processing part 111b may be configured to maintain the cores 151 within a tolerable curvature range. Such a remaining length processing part 111b may also be provided on the adaptor tray 104. In addition, a plurality of cable clips 111a for arranging the uncut cores 151 of the optical cable 105 may be arranged at regular intervals within the housing 101. The uncut cores 151 may be arranged around the remaining length processing part 111b, and anchored by the cable clips 111a inside the housing 101.

In addition, a plurality of adaptor fastening parts 111c may be located around the remaining length processing part 111b. At least a portion of the adaptor fastening parts 111c may serve as a unit for fastening the optical adaptors. Such adaptor fastening parts 111c are not necessarily located around the remaining length processing part 111b. For example, it may be located on the adaptor tray 104.

The housing 101 may be provided with wiring holes 117 for wiring an optical cable 105 and line distribution holes 119 for wiring subscriber lines. A required number of cores may be branched out and distributed to the subscriber lines within the terminal box 100, in which each of the subscriber lines is wired to a subscriber terminal device through one of the line distribution holes 119.

The wiring holes 117 and the line distribution holes 119 may be formed on one side of the housing 101. When the housing 101 is installed outdoors, the terminal box 100 may be arranged in such a manner that the wiring holes 117 and the line distribution holes 119 are oriented downward, for example, as to be directed toward the ground. Thus, hereinafter, the side of the housing, through which the wiring holes 117 and the line distribution holes 119 may be formed, will be referred to as the "bottom side" of the housing 101.

Figure 3:
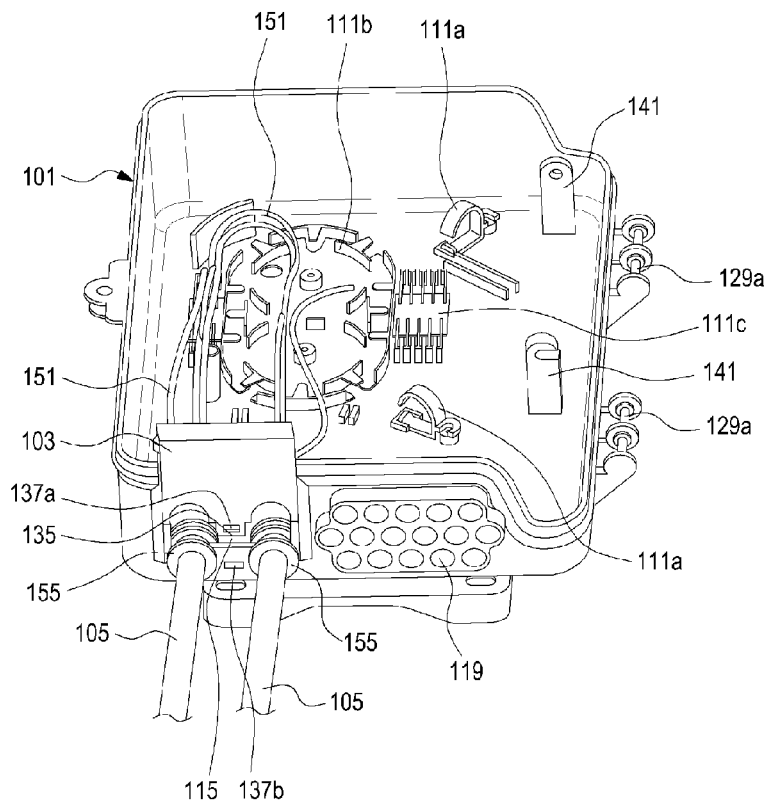
FIG. 3 is an exploded perspective view illustrating an example of a cover member of the optical cable terminal box of FIG. 1 in a state in which the cover member is in the process of being coupled to a housing.
Figure 4:
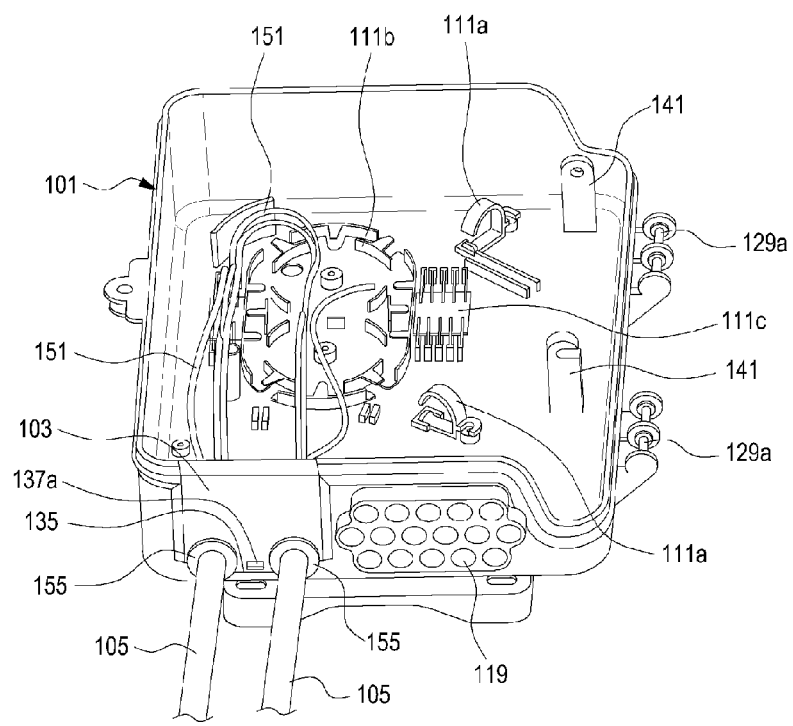
FIG. 4 is an exploded perspective view illustrating the cover member of FIG. 3 in a state in which it is coupled to the housing.

The bottom side of the housing 101 may be provided with a slot 115, for example, as illustrated in FIG. 3. More specifically, the slot 115 may be configured to provide an operation space for wiring the optical cable 105, and may be connected to an opened side of the housing 101 provided by the opening the cover 102. First receiving grooves may be formed at an edge of the slot 115. In FIG. 3, the first receiving grooves are not directly shown because the optical cable 105 is received in the first receiving grooves.

The slot 115 may be formed in a rectangular opening shape formed by removing a part of the bottom side of the housing 101, and the first receiving grooves may be formed by additionally removing the bottom side of the housing 101 that is to be connected to the slot 115. Accordingly, in a state in which the slot 115 is opened, the optical cable can be freely wired, or the wired optical cable can be freely removed.

A tie protrusion 137b may be formed on the bottom side of the housing 101 adjacent to the slot 115, and more specifically between the first receiving grooves. As described below, the tie protrusion 137b may serve as a unit for fastening the cover member 103 to cover the slot 115.

Figure 5:
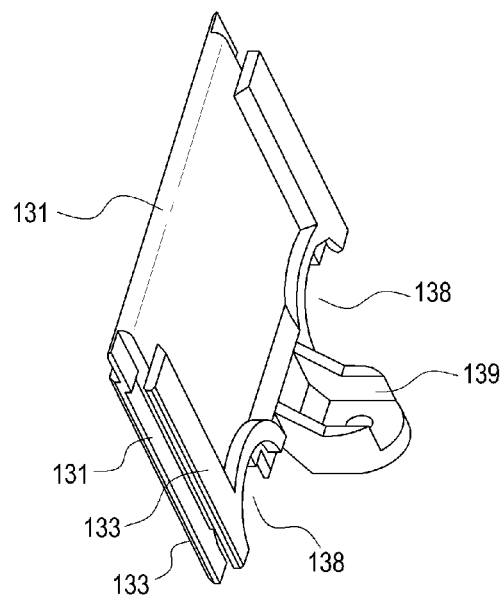
FIG. 5 is a perspective view illustrating the cover member of the optical cable terminal box of FIG. 3.

An example of a cover member 103 that is coupled to the housing 101 in order to close a slot 115 is illustrated in FIG. 5. The cover member 103 may be slid into a slot formed in the body of the housing 101 to be coupled to the housing 101. Each of the opposite side edges of the cover member 103 may be provided with a slit 131, in which guide members 133 are formed on the cover member 133 to form the slits 131. More specifically, a pair of the guide members 133 may be provided at each of the opposite side edges of the cover member 103 so as to be opposite to each other in order to form a slit 131 therebetween. When the cover member 103 is coupled to the housing 101, the guide members 133 may be engaged with the inner and outer surfaces of the bottom side wall of the housing 101 along the opposite sides of the slot 115.

A pair of second receiving grooves 138 may be formed at an edge of the cover member 103 parallel to each other. The second receiving grooves 138 may be formed by partially removing a portion of the cover member 103 along an edge of the cover member 103, the cover member 103 having a substantially rectangular shape. When the cover member 103 is coupled to the housing 101, each of the second receiving grooves 138 may form a pair with one of the first receiving grooves to form one of the wiring holes 117. That is, each of the wiring holes 117 may take a complete shape as the cover member 103 is coupled to the housing 101 in such a manner that the first receiving grooves formed at the bottom edge of the slot 115 and the second receiving grooves 138 formed at the bottom edge of the cover member 103 are coupled to each other, respectively, rather than being completely formed in the housing 101.

In order to fasten the cover member 103 to the housing 101, the cover member 103 may be formed with a tie rib 135 and a fastening member 139 to extend from the bottom edge of the cover member 103. Preferably, the tie rib 135 may be formed on the outer surface of the cover member 103, and the fastening member 139 may be formed on the inner surface of the cover member 103. When the cover 103 is coupled to the housing 101, the tie rib 135 may be positioned to be engaged with the outer surface of the housing 101 between the first receiving groove, and the fastening member 139 may be positioned inside of the housing 101. Although not shown, the fastening member 139 may be engaged with and fastened to the inner surface of the housing through a separate screw or the like. The tie rib 135 may be provided with a tie groove 137a, and the tie protrusion 137b may be engaged in the tie groove 137a when the cover member 103 is coupled to the housing 101.

The cover member 103 may be fastened by the tie protrusion 137b, the tie rib 135 and the tie groove 137a. Thus, a technician handling the terminal box 101 can separate the cover member 103 from the housing 101 by applying force to the cover member 103. Also, the fastening member 139 may fasten the cover member 103 to the terminal box 101 through a separate anchoring unit.

Figure 6:
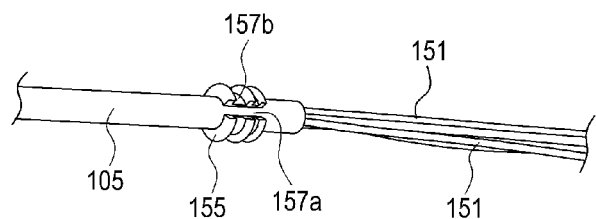
FIG. 6 is a perspective view illustrating an example of a cable bushing of the optical cable terminal box of FIG. 3 in a state in which the cable bushing is coupled to an optical cable.

In order to provide a sealing effect, such as waterproofing, the terminal box may further include a cable bushing 155 between the optical cable 105 and each of the wiring holes 177. Referring to FIG. 6, each of the cable bushings 155 may be provided with a slit at a part 157a so that the cable bushings have a C-shaped cross-section perpendicular to the longitudinal direction of the optical cable 105. In addition, the cable bushings 155 may have a sealing groove 157 formed on its outer peripheral so as to extend circumferentially. The cable bushings 155 may be formed from an elastic material, such as a rubber material or the like, so that it can be deformed by an external force temporarily applied thereto, and can return to its original shape without the application of an external force.

A technician may expand the slit part 157a of the cable bushing 155, and fit the cable bushing 155 on the optical cable to wrap the outer periphery of the optical cable 105. To fasten an optical cable 105 to the housing 101, in the state in which such a cable bushing 155 is fit on the optical cable 155, the cable bushing 155 may be placed on each of the first receiving grooves and the cover member 103 may be coupled to the housing 101. At this time, a part of the housing 101 and a part of the cover member 103 may be inserted into each sealing groove 157b along the edge of each of the wiring holes 117. The sealing groove 157b may be formed to have a width that is smaller than the thickness of each of the housing 101 and the cover member 103; thus, the cable bushing 155 may come into close contact with the housing 101 and the cover member 103 to provide a sealing effect when a part of the housing 101 and a part of the cover member 103 are inserted into the sealing groove 157b.

When the cover member 103 is coupled to the housing 101 in the state in which the cover member 103 is inserted into the sealing groove 157b, the tie protrusion 137b may be engaged with the tie groove 137a, and the fastening member 139 may be fastened from the inside of the housing 101 with a separate screw. At this time, the cover member 103 may compress the cable bushing 155 in such a manner that the cable bushing 155 is pressed to some degree and the slit part 157a of the cable bushing 155 is sealingly closed.

According to the teachings above, there is provided provide a terminal box which may mitigate the damage of an optical cable and cores of the optical cable in the process of installing the optical cable.

Another aspect of the disclosure is to provide an optical cable terminal box which may allow an optical cable to be wired and branched without being cut. Also, another aspect of the disclosure is to provide a terminal box which may allow an optical cable to be wired and branched without being cut, whereby fusion-splicing operations can be minimized.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

INDUSTRIAL APPLICABILITY

As described above, the present disclosure provides an optical terminal box in which the wiring holes of an optical cable terminal box are configured in an opened type so that an optical cable can be freely located in or separated from the wiring holes in the process of installing the terminal box on an optical communication line. This makes it possible to install the terminal box and the optical cable without cutting the cores that are not to be branched among the plurality of cores of the optical cable. Because unnecessary cutting and fusion-splicing of cores are not required during the process of installing the terminal box, the installing operation can be easily performed.

The invention claimed is:

1. An optical cable terminal box for distributing an optical cable with a plurality of cores to subscriber lines, comprising:
   a housing having a slot, the slot having a first receiving groove formed at an edge of the slot; and
   a cover member slidably coupled to the housing to close the slot, the cover member having a second receiving groove formed at an edge of the cover member;
   a tie protrusion formed on the outer surface of the housing adjacent to the slot;
   a tie rib extending from the edge of the cover member; and
   a tie groove formed on the tie rib,
   wherein when the cover member closes the slot, the tie protrusion is engaged with the tie groove, and the first and second grooves are coupled to each other to form a wiring hole that is configured to pass an optical cable therethrough.

2. The optical cable terminal box as claimed in claim 1, wherein the cover member has slits which are formed at the opposite side edges thereof, the slits being positioned to partially wrap inner and outer surfaces of the hosing in the vicinity of the slot.

3. The optical cable terminal box as claimed in claim 2, further comprising guide members that are formed on the inner and outer surfaces at each of the opposite side edges to be opposite to each other, the slits being formed between the guide members.

4. The optical cable terminal box as claimed in claim 1, wherein the wiring hole is formed at each side of the tie protrusion.

5. The optical cable terminal box as claimed in claim 1, wherein the cover member further comprises a fastening member extending from the edge of the cover member and positioned inside of the housing, the fastening member being fastened to the inside of the housing.

6. The optical cable terminal box as claimed in claim 1, further comprising a cable bushing positioned in the wiring hole to wrap the optical cable.

7. The optical cable terminal box as claimed in claim 6, wherein the cross-section of the cable bushing sectioned perpendicularly to the longitudinal direction of the optical cable has a C-shape.

8. An optical cable terminal box for distributing an optical cable with a plurality of cores to subscriber lines, optical cable terminal box comprising:
   a housing having a slot, the slot having a first receiving groove formed at an edge of the slot;
   a cover member slidably coupled to the housing to close the slot, the cover member having a second receiving groove formed at an edge of the cover member;
   a cable bushing positioned in a wiring hole to wrap the optical cable; and
   a sealing groove formed on the outer periphery of the cable bushing,
   wherein when the cover member closes the slot, the first and second grooves are coupled to each other to form the wiring hole that is configured to pass an optical cable therethrough, and
   wherein each of the housing and the cover member is partially inserted into the sealing groove.

* * * * *